US010705255B2

(12) United States Patent
Yuzhakov et al.

(10) Patent No.: US 10,705,255 B2
(45) Date of Patent: Jul. 7, 2020

(54) METHOD OF AND SYSTEM FOR GENERATING A WEATHER FORECAST

(71) Applicant: YANDEX EUROPE AG, Lucerne (CH)

(72) Inventors: Aleksandr Sergeevich Yuzhakov, Khanty-Mansysky (RU); Pavel Ivanovich Vorobyev, Moscow (RU); Mikhail Aleksandrovich Royzner, Moscow (RU); Victor Grigorievich Lamburt, Moscow (RU); Dmitry Valentinovich Solomentsev, Moscow (RU); Svetlana Olegovna Pospelova, Ekaterinbur (RU)

(73) Assignee: YANDEX EUROPE AG, Lucerne (CH)

( * ) Notice: Subject to any disclaimer, the term of this patent is extended or adjusted under 35 U.S.C. 154(b) by 455 days.

(21) Appl. No.: 15/475,390

(22) Filed: Mar. 31, 2017

(65) Prior Publication Data
US 2017/0299772 A1 Oct. 19, 2017

(30) Foreign Application Priority Data

Apr. 18, 2016 (RU) ................................ 2016114881

(51) Int. Cl.
G01W 1/10 (2006.01)
G06N 99/00 (2019.01)
G06N 20/00 (2019.01)

(52) U.S. Cl.
CPC .............. *G01W 1/10* (2013.01); *G06N 20/00* (2019.01)

(58) Field of Classification Search
CPC .................. G01W 1/10; G06N 20/00
See application file for complete search history.

(56) References Cited

U.S. PATENT DOCUMENTS 5,461,699 A 10/1995 Arbabi et al.
6,535,817 B1 3/2003 Krishnamurti
(Continued)

FOREIGN PATENT DOCUMENTS

CN 102184337 A 9/2011
CN 104299044 A 1/2015

OTHER PUBLICATIONS

Grover, A Deep Hybrid Model for Weather Forecasting, Microsoft Research. Aug. 10-13, 2015, Sydney, NSW, Australia.
(Continued)

*Primary Examiner* — Regis J Betsch
*Assistant Examiner* — Jeremy A Delozier
(74) *Attorney, Agent, or Firm* — BCF LLP

(57) ABSTRACT

There is disclosed a method and a system for creating a weather forecast. The method is implemented on a server. The method comprises: receiving, by the machine learning module, at least one current weather measurement parameter at a measurement time; receiving, by the machine learning module, a first average value of a historical weather parameter for the measurement time; generating, by the machine learning module, a normalized value of the weather measurement parameter based on a difference between the current weather measurement parameter and the first average value of the historical weather parameter for the measurement time; training the machine learning module to create a normalized value of a weather forecasting parameter based on, at least partially, the normalized value of the weather measuring parameter, the normalized value of the weather forecasting parameter being associated with a future forecasting time, the future forecasting time occurring after the measurement time.

16 Claims, 7 Drawing Sheets

(56) References Cited

U.S. PATENT DOCUMENTS

| | | |
|---|---|---|
| 6,748,327 B1 | 6/2004 | Watson |
| 6,778,929 B2 | 8/2004 | Egi |
| 7,082,382 B1 | 7/2006 | Rose et al. |
| 7,792,664 B1 | 9/2010 | Crawford et al. |
| 8,538,696 B1 | 9/2013 | Cassanova |
| 2002/0016676 A1 | 2/2002 | Sann |
| 2004/0043760 A1 | 3/2004 | Rosenfeld et al. |
| 2004/0064255 A1 | 4/2004 | Egi |
| 2004/0143396 A1 | 7/2004 | Allen et al. |
| 2008/0255760 A1* | 10/2008 | Rojicek ............... G06Q 10/04 702/3 |
| 2009/0316671 A1 | 12/2009 | Rolf et al. |
| 2010/0274542 A1 | 10/2010 | Krupansky |
| 2013/0117608 A1* | 5/2013 | Kirby ................. G01W 1/10 714/32 |
| 2014/0025354 A1 | 1/2014 | Padullaparthi et al. |
| 2014/0303893 A1 | 10/2014 | Leblanc |
| 2014/0324350 A1* | 10/2014 | Hamann ............. G01W 1/10 702/3 |
| 2015/0253463 A1 | 9/2015 | Narayanaswamy et al. |
| 2017/0117711 A1* | 4/2017 | He ....................... H02S 50/10 |

OTHER PUBLICATIONS

Monteleoni, Tracking climate models, Statistical Analysis and Data Mining JournalVolume 4 Issue 4 pp. 372-392, John Wiley & Sons, Inc. New York, NY, USA, Aug. 2011.

Hossain, Forecasting the weather of Nevada: A deep learning approach Neural Networks (IJCNN), 2015 International Joint Conference on pp. 1-6, Date of Conference: Jul. 12-17, 2015, Hossain, M. Dept. of Comput. Sci. & Eng., Univ. of Nevada, Reno, Reno, NV, USA.

Krishnamurti, Multimodel Ensemble Forecasts for Weather and Seasonal Climate, Source: American Meteorological Society, Nov. 8, 1999.

English Abstract of CN104299044 retrieved on Espacenet on Jan. 24, 2017.

English Abstract of CN102184337 retrieved on Espacenet on Jan. 24, 2017.

* cited by examiner 400    212

RUSSIA, MOSCOW, VNUKOVO Airport — 404

| Date | Temperature °C | Wind M/S | Percipitation % |
|---|---|---|---|
| 11.02.2001 | 2,0 | 4,0 | 90,8 |
| 11.02.2002 | 1,6 | 3,4 | 90,1 |
| 11.02.2003 | -17,6 | 1,4 | 69 |
| 11.02.2004 | -12,9 | 4,7 | 85,9 |
| 11.02.2005 | -15,3 |  | 82,9 |
| 11.02.2006 | -18,0 | 4,2 | 77,0 |
| 11.02.2007 | -12,4 | 1,2 | 83,2 |
| 11.02.2008 | -14,7 | 3,3 | 85,9 |
| 11.02.2009 | -5,7 | 2,5 | 94,4 |
| 11.02.2010 |  | 6,1 | 75,6 |
| 11.02.2011 | -11,3 | 2,8 | 86,5 |
| 11.02.2012 | -17,3 | 3,2 | 79,7 |
| 11.02.2013 | -2,7 | 4,1 | 91,3 |
| 11.02.2014 | -1,8 | 3,7 | 95,7 |
| 11.02.2015 | -9,4 | 1,5 |  |

| Current Date | Location | Prediction Time | Weather Parameter |
|---|---|---|---|
| 11.02.2016 | RUSSIA, MOSCOW, VNUKOVO Airport | 15.02.2016 | Temperature +1 °C |
| 11.02.2016 | RUSSIA, MOSCOW, VNUKOVO Airport | 11.03.2016 | Temperature +10 °C |

226

| Prediction Date | Location | Prediction Time | Temperature |
|---|---|---|---|
| 11.02.2016 | RUSSIA, MOSCOW, VNUKOVO Airport | 11.02.2016 | Temperature -5 °C |
| 28.01.2016 | RUSSIA, MOSCOW, VNUKOVO Airport | 11.02.2016 | Temperature -3 °C |
| 08.02.2016 | RUSSIA, MOSCOW, VNUKOVO Airport | 11.02.2016 | Temperature +1 °C |

FIG. 5

METHOD OF AND SYSTEM FOR GENERATING A WEATHER FORECAST

CROSS-REFERENCE

The present application claims priority to Russian Patent Application No. 2016114881, filed Apr. 18, 2016, entitled "СПОСОБ И СИСТЕМА ДЛЯ СОЗДАНИЯ ПРОГНОЗА ПОГОДЫ" (METHOD OF AND SYSTEM FOR GENERATING A WEATHER FORECAST), the entirety of which is incorporated herein by reference.

FIELD OF THE TECHNOLOGY

Present technology relates to systems for weather forecasting in general and, more particularly to a method of and a system for generating a weather forecast.

BACKGROUND

In modern days, weather forecasting is widely used in a variety of situations. Weather forecasting can be divided, for example, into the following types depending on the purpose. Agricultural forecasts include detailed characteristics of the atmospheric precipitation; sea and river forecasts include detailed descriptions of wind, waves, atmospheric phenomena, air temperature; aviation forecasts include detailed descriptions of wind, visibility, atmospheric phenomena, cloudiness, air temperature, and forecasts for general consumer use include brief information about cloud cover, precipitation, atmospheric phenomena, wind, temperature, humidity, atmospheric pressure, etc.

A user can receive current weather parameters data for a given territory from a variety of sources, e.g. radio stations, television, the Internet, etc. At the same time, the accuracy of the current weather parameters can be considered to be reliable enough as it is based on the real data received from the weather stations. FIG. 1 shows a screenshot 100 of the Realmeteo web-site, which can be accessed by the user via the Internet using known means. The screenshot 100 shows current time and date 102, the territory 104 (Moscow), current weather parameters 106 and data 108 in respect to the location of a weather station, from which the current weather parameters 106 were received. The accuracy of the current weather parameters depends on the accuracy of equipment of the data provider, in this example, the weather station located in the Vnukovo airport area. At present, the world meteorological organization (WMO) collects meteorological, climatological, hydrological as well as marine and oceanographic data around the world via more than 15 satellites, 100 anchored buoys, 600 drifting buoys, 3,000 aircrafts, 7,300 ships and around 10,000 ground stations. Member countries of the WMO have access to this data.

The user can also get data representative of a forecasted weather parameters for a given moment in time in the future (the given moment in the future, after the current moment of time) for a given territory from either the same and/or other sources. However, the accuracy of the forecast parameters depends on the time of the forecast (i.e. how far in advance the forecast is being executed), the forecast method, the given territory and many other criteria. For example, depending on the time of the forecast vis-a-vis the time in the future for which the forecast is being generated, the forecast can be categorized as: a very-short-range forecast—up to 12 hours; a short-range forecast—from 12 to 36 hours; a mid-range forecast—from 36 hours to 10 days; a long-range forecast—from 10 days to a season (3 months); and a very-long-range forecast—more than 3 months (a year, a few years). The accuracy of the forecasts generally decreases the the increase of time between the time when the forecast is generated and the time for which the forecast is generated. As an example, the accuracy (reliability) of the very-short-range forecast can be 95-96%, the short-range forecast—85-95%, the mid-range forecast—65-80%, the long-range forecast—60-65%, and the very-long-range forecast—not more than 50%.

The accuracy also depends on the forecasting methods used for generating the forecast. At the moment, the numerical models of weather forecasting are generally considered to be the most accurate and the most reliable of all the known forecasting methods. Put another way, forecasting methods implemented by computational systems for weather forecasting using current weather parameters data. These computational systems can used raw data provided by weather balloons, weather satellites, and ground weather stations.

The accuracy of the weather forecasts is a general concern in the industry, and several known technologies have attempted to address this concern.

U.S. Pat. No. 6,778,929 discloses method and system for estimating (forecasting) meteorological quantities. Estimation method for obtaining estimation results of meteorological quantities in a specified area during a specified future period, including steps of: provisionally creating a meteorological time-series model from historical data of the meteorological quantities observed in the specified area; adjusting parameters of the created time-series model on the basis of long-range weather forecast data for wider area, which contains future meteorological tendency relative to normal years, to adjust the created time-series model; and conducting simulation using the adjusted time-series model to obtain the estimation results.

US patent application 2010/027,4542 discloses a method and software program for providing a weather prediction of atmospheric parameters for an aircraft, includes collecting at least one of a statistical description of the weather forecast or the historical weather data, processing current atmospheric data received from sensors on-board the aircraft, forming modeled data based on the processed current atmospheric data and the at least one of a statistical description of the weather forecast or the historical weather data, blending the modeled data with the at least one of a statistical description of the weather forecast or the historical weather data, and predicting atmospheric parameters based on the blending step.

U.S. Pat. No. 5,461,699 discloses a a system and method for forecasting that combines a neural network with a statistical forecast is presented. A neural network having an input layer, a hidden layer, and an output layer with each layer having one or more nodes is presented. Each node in the input layer is connected to each node in the hidden layer and each node in the hidden layer is connected to each node in the output layer. Each connection between nodes has an associated weight. One node in the input layer is connected to a statistical forecast that is produced by a statistical model. All other nodes in the input layer are connected to a different historical datum from the set of historical data. The neural network being operative by outputting a forecast, the output of the output layer nodes, when presented with input data. The weights associated with the connections of the neural network are first adjusted by a training device. The training device applies a plurality of training sets to the neural network, each training set consisting of historical data, an associated statistical output and a desired forecast, with each set of training data the training device determines a difference between the forecast produced by the neural network given the training data and the desired forecast, the training device then adjusts the weights of the neural network based on the difference.

The present technology arises from an observation made by the inventor(s) that there is at least one technical problem, known in the art, related to the need to improve the accuracy of weather forecasts.

SUMMARY

It is an object of the present technology to improve the accuracy of weather forecasting by reducing the inaccuracy of the prediction algorithm.

In accordance with a first broad aspect of the present technology, there is provided a method of generating a weather forecast. The method is executable on a server, the server including a processor and a machine learning module. The method comprises: receiving, by the machine learning module, at least one current weather measurement parameter, the at least one current weather measurement parameter being a weather parameter at a measurement time; receiving, by the machine learning module, a first average value of a historical weather parameter for the measurement time; generating, by the machine learning module, a normalized value of the weather measurement parameter based on a difference between the current weather measurement parameter and the first average value of the historical weather parameter for the measurement time; training the machine learning module to create a normalized value of a weather forecasting parameter based on, at least partially, the normalized value of the weather measuring parameter, the normalized value of the weather forecasting parameter being associated with a future forecasting time, the future forecasting time occurring after the measurement time.

In some implementations of the method, the method further comprises: receiving, by the machine learning module, a second average value of the historical weather parameter for the measurement time; creating, by the machine learning module, a weather forecasting parameter based on the difference between the normalized value of the weather forecasting parameter and the second average value of the historical weather parameter for the moment of forecasting.

In some implementations of the method, the first average value of the historical weather parameter is based on a historical weather parameter data received prior to the measurement time.

In some implementations of the method, the method further comprises generating the first average value of the historical weather parameter based on the historical weather parameter data using a static model of weather forecasting.

In some implementations of the method, the method further comprises generating the first average value of the historical weather parameter based on the historical weather parameter data, the generating executed using a second machine learning algorithm.

In some implementations of the method, the weather measurement parameter is at least one of: an air temperature, a water temperature, an atmospheric pressure, a wind velocity, a wind direction, humidity, cloudiness, and precipitation.

In some implementations of the method, the method further comprises receiving, by the machine learning module, from a third-party weather forecast service at least one value of the weather forecasting parameter for the future forecasting time; and wherein the training of the machine learning module to create the normalized value of the weather forecasting parameter is executed taking into account the value of the weather forecasting parameter and the normalized value of the weather measurement parameter.

In some implementations of the method, the method further comprises receiving from a third-party weather forecast service: at least one value of the weather forecasting parameter at the moment for the future forecasting time and the historical weather forecasting data; and wherein the training of the machine learning module to create the normalized value of the weather forecasting parameter is executed taking into account the value of the weather forecasting parameter and the historical data of the weather forecasts.

In some implementations of the method, the third-party weather forecast service is a plurality of third-party weather forecast services, and a value of the weather forecasting parameter for the moment of forecasting is an average value of the forecasting parameters received from the plurality of third-party weather forecast services.

In some implementations of the method, the method further comprises setting a maximum deviation parameter for the forecasting parameter value received from the third-party weather forecast services relative to the normalized value of the weather forecasting parameter; and wherein the method further comprises: responsive to a given forecasting parameter value received from a given third-party weather forecast service exceeding the maximum deviation parameter, disregarding the given forecasting parameter value while creating the second normalized value of the weather measurement parameter.

In some implementations of the method, the method further comprises receiving an indication of the future forecasting time.

In some implementations of the method, the future forecasting time is a plurality of future forecasting times, and wherein the machine learning module generates a plurality of the normalized values of the weather forecasting parameters for each one of the future forecasting times.

In some implementations of the method, each of the plurality of future forecasting times is associated with one of a plurality of related geographic regions for a single moment of time.

In some implementations of the method, the method further comprises receiving a request with an indication to a specific object location, and wherein generating the normalized value of the forecast parameter for the indicated object location is executed.

In accordance with another broad aspect of the present technology, there is provided a method of creating a weather forecast, the method being executed on a server including a processor and a machine learning module. The method comprises: receiving of a request to create a weather forecast; receiving by a machine learning module at least one current weather measurement parameter being a weather parameter at a measurement time; receiving by the machine learning module a first average value of a historical weather parameter for the measurement time; creating by the machine learning module a normalized value of a weather measurement parameter based on a difference between a current weather measurement parameter and a first average value of the historical weather parameter for the measurement time; creating by the machine learning module the normalized value of a weather forecasting parameter based on the normalized value of the weather measuring parameter, and the normalized value of the weather forecasting parameter is connected to the moment of forecasting after the measurement time; based on the normalized value of the weather forecasting parameter, creating the weather forecast.

In accordance with yet another broad aspect of the present technology, there is provided a server for creating a weather forecast. The server comprises: a machine learning module and a processor operationally connected to the machine learning module, the processor is configured to execute: receiving, by the machine learning module, at least one current weather measurement parameter, the at least one current weather measurement parameter being a weather parameter at a measurement time; receiving, by the machine learning module, a first average value of a historical weather parameter for the measurement time; generating, by the machine learning module, a normalized value of the weather measurement parameter based on a difference between the current weather measurement parameter and the first average value of the historical weather parameter for the measurement time; training the machine learning module to create a normalized value of a weather forecasting parameter based on, at least partially, the normalized value of the weather measuring parameter, the normalized value of the weather forecasting parameter being associated with a future forecasting time, the future forecasting time occurring after the measurement time.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both cases are included within the expression "at least one server".

In the context of the present specification, "electronic device" (or "computer device") is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

In this context, terms a "first", a "second", a "third", etc. were used as ordinal numbers only to show the difference between these nouns and not to describe any particular type of relationship between them.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (descriptions, advertisements, messages, etc.), documents, spreadsheets, etc.

In the context of the present specification, unless expressly provided otherwise, an "indication" to a digital object can the digital object itself or a pointer, reference, link, or other indirect mechanism enabling the recipient of the indication to locate a network, memory, database, or other computer-readable medium location from which the digital object may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of a digital object will take the form of a database key for an entry in a particular table of a predetermined database containing the digital object, then the sending of the database key is all that is required to effectively convey the digital object to the recipient, even though the digital object itself was not transmitted as between the sender and the recipient of the indication.

In the context of the present specification, the expression a "current weather measurement parameter" includes the last (the most recent) measured value of the weather measurement parameter. As a weather measurement parameter, for example, air temperature, water temperature, atmospheric pressure, wind velocity, wind direction, humidity, cloudiness, and precipitation can be used.

In the context of the present specification "historical weather parameter" includes a value of a weather parameter for a specific date and location known from the history of observations (measurements) in previous years. For example, according to the WMO data about 1 Mar. 2015 (the last year), air temperature in Moscow was +1° C., and on the 1 Mar. 1965, it was −12.6° C., and so on. A retrospective span of and the number of known historical weather parameters for the various locations can vary.

In the context of the present specification, a "weather forecasting parameter" is a forecast value of the weather parameter for the specific location or multiple locations for a specific moment or a time period in the future.

In the context of the present specification, a "third-party weather forecast service" is a resource containing data available for retrieving about the weather parameter forecasts for various locations at various moments or time periods in the future and/or a computer program that is capable to generate weather forecasting parameters on request for the specific location at the specific moment or time period in the future.

In the context of the present specification, a "historical weather forecasting parameter" is a value of a weather parameter that had been forecast earlier for the moment which has already past. Namely, historical weather forecasting parameter can show the changes in the weather forecast as the time of the forecast is approaching.

In the context of the present specification, an "object location" is a location of a geographical object, namely, a specific region, city, area, airport, railroad station, etc. Specific geographical coordinates, for example, geolocation data, which can be received by a server from an electronic device via a communication network, can also be used as an object location.

In the context of the present specification, the expression "data storage" is intended to include media of any nature and kind whatsoever, including RAM, ROM, disks (CD-ROMs, DVDs, floppy disks, hard drivers, etc.), USB keys, solid state-drives, tape drives, etc.

Implementations of the present technology each have at least one of the above-mentioned object and/or aspects.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4 is an illustrative example of a database of historical weather parameters, the database implemented in accordance with non-limiting embodiments of the present technology.

FIG. 5 is an illustrative example of a database of a third-party weather forecast service, the database implemented in accordance with non-limiting embodiments of the present technology.

DETAILED DESCRIPTION

The examples and conditional language recited herein are principally intended to aid the reader in understanding the principles of the present technology and not to limit its scope to such specifically recited examples and conditions. Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Figure 2:
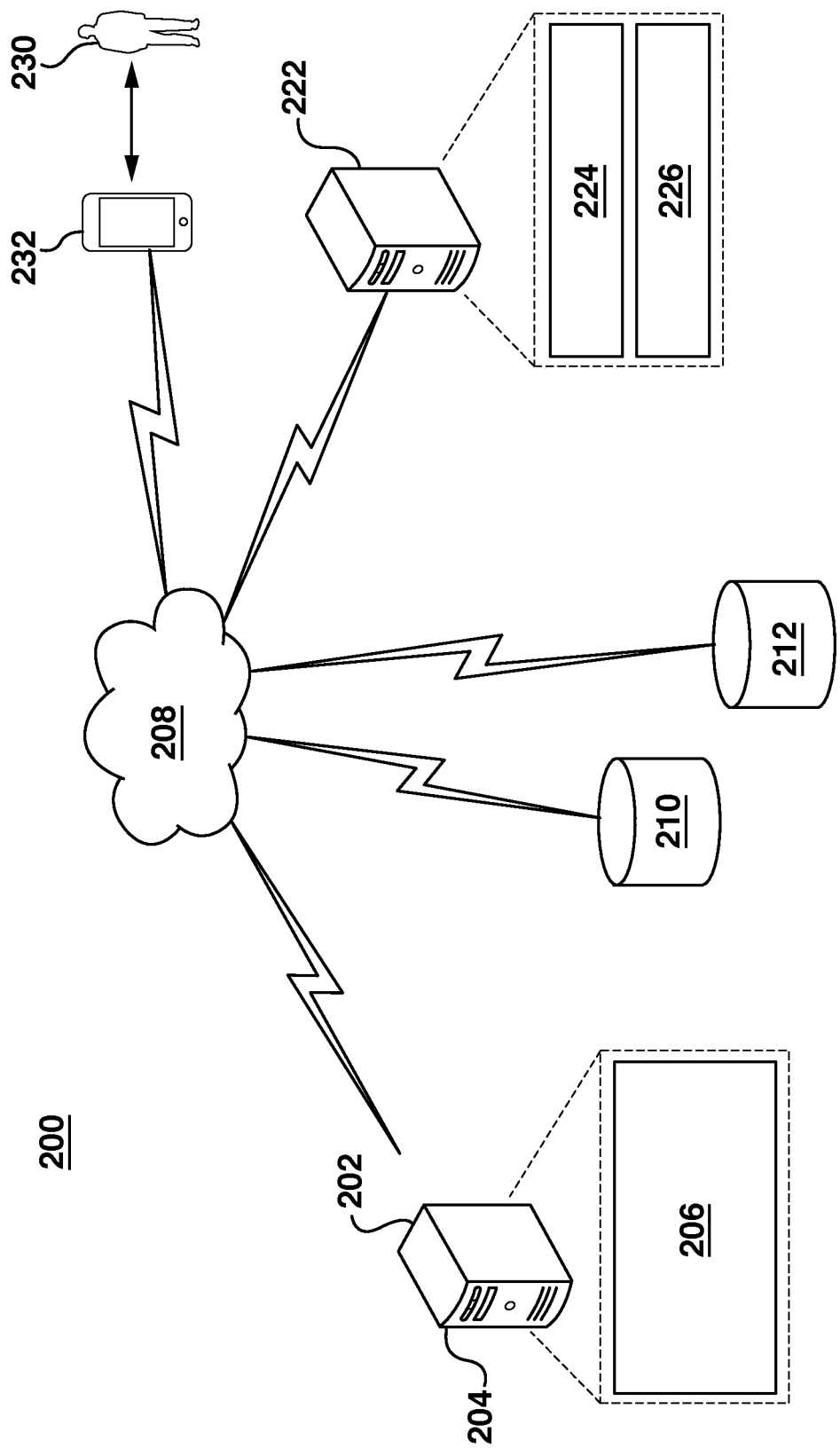
FIG. 2 is a schematic diagram illustrating a system, the system being implemented in accordance with non-limiting embodiments of the present technology.

FIG. 2 illustrates a diagram of a computer system 200. It is to be expressly understood that the computer system 200 is merely one possible implementation of the present technology. In some cases, what are believed to be helpful examples of modifications to the computer system 200 may also be set forth below. This description is not intended to define the scope or set forth the bounds of the present technology. In some cases, what are believed to be helpful examples of modifications to computer system 200 may also be set forth below. This is done merely as an aid to understanding, and, again, not to define the scope or set forth the bounds of the present technology. These modifications are not an exhaustive list, and, as a person skilled in the art would understand, other modifications are likely possible. In addition it is to be understood that the computer system 200 may provide in certain instances simple implementations of the present technology, and that where such is the case they have been presented in this manner as an aid to understanding. As persons skilled in the art would understand, various implementations of the present technology may be of a greater complexity.

The computer system 200 comprises at least one server 202, a communication network 208, a current weather parameters data storage 210, a historical weather parameters data storage 212 and a historical weather parameters data storage 212. Further, the computer system 200 can comprise at least one a third-party weather forecast service 222 and/or at least one electronic device 232.

The server 202 may be implemented as a conventional computer server. In an example of an embodiment of the present technology, the server 202 may be implemented as a Dell™ PowerEdge™ Server running the Microsoft™ Windows Server™ operating system. Needless to say, the server 202 may be implemented in any other suitable hardware and/or software and/or firmware or a combination thereof. In this non-limiting embodiment of the present technology, the server 202 is implemented as a single server. In alternative non-limiting embodiments of the present technology, the functionality of the server 202 may be distributed and may be implemented via multiple servers.

The implementation of the server 202 is well known. However, briefly speaking, the server 202 comprises a communication interface (not depicted) structured and configured to communicate with various entities (such as the current weather parameters data storage 210, the historical weather parameters data storage 212 and other devices potentially coupled to the communication network 208) via the communication network 208. The server 202 also comprises at least one processor 204 operationally connected with the communication interface structured and configured to execute various process to be described herein. The server 202 further comprises at least one machine learning module 206, the machine learning module 206 being configured, when executed, to cause the processor 204 to perform various operations to be described herein.

The machine learning module 206 can be implemented as program instructions implementing a machine learning algorithm. Any suitable algorithm can be applied as the machine learning algorithm, for example: artificial neural network, Bayesian statistics, Gaussian regression process, decision trees, etc.

The machine learning module 206 may further comprise program instructions also implementing other algorithms, namely, calculating of the average historical value a, creating a normalized value of the weather measurement parameter based on the difference between a current weather measurement parameter and an average value of the historical weather parameter for the measurement time. The machine learning module 206 will be described in more details below.

The server 202 is communicatively coupled (or otherwise has access) to a current weather parameters data storage 210 and a historical weather parameters data storage 212. The current weather parameters data storage 210 of current weather parameter and the historical weather parameters data storage 212 can either be implemented as one common data storage or as at least two different data storages (shown in FIG. 2). Although the data storages 210 and 212 are described as separate from the server 202, in alternative embodiments functionality of at least one of the data storages 210 and 212 may be implemented via the server 202. In other non-limiting implementations of the present technology, functionality of each of the data storages 210 and 212 may be distributed between multiple data storages.

Figure 1:
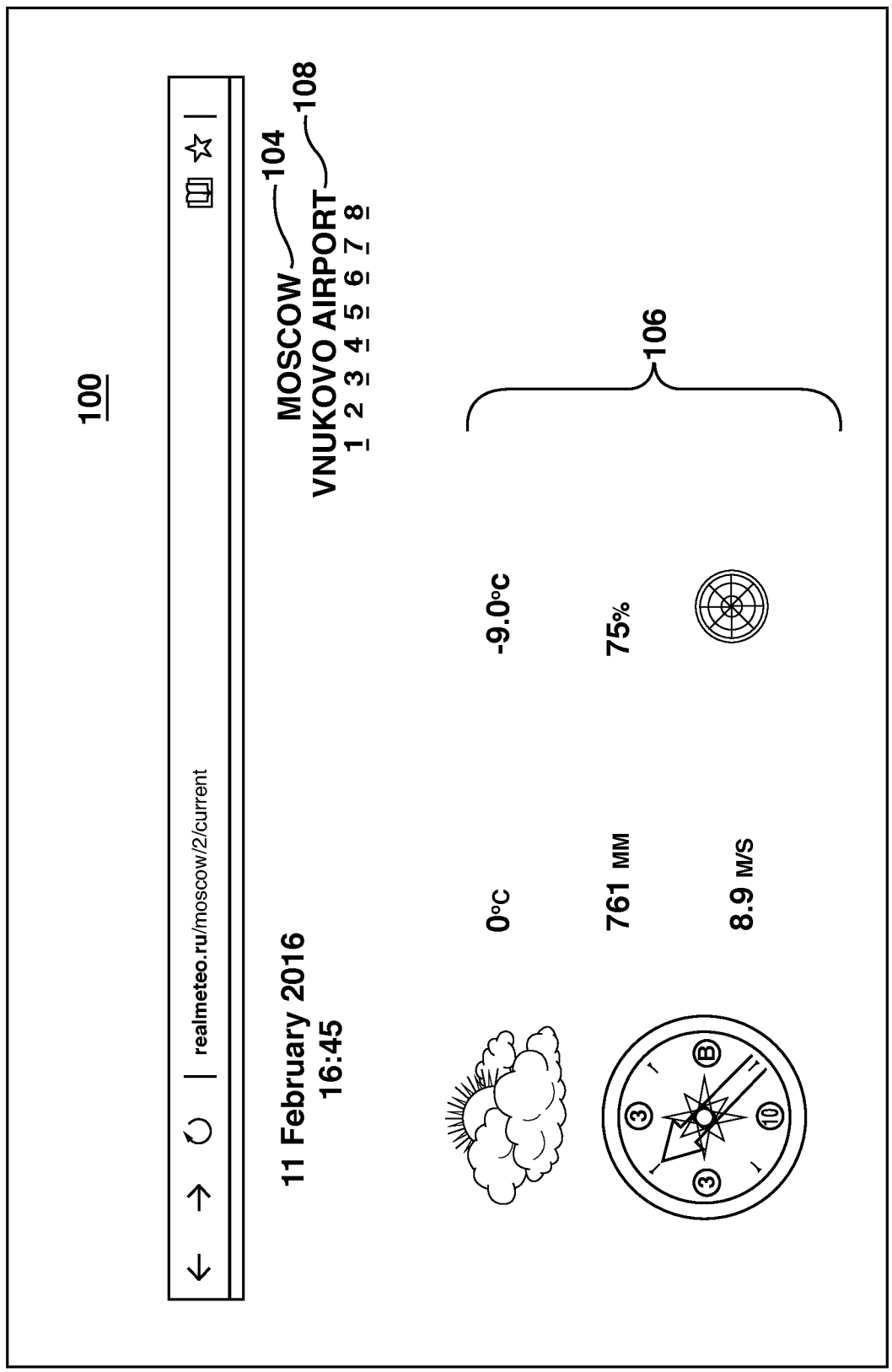
FIG. 1 is a screenshot of an example representation of data about the current weather parameters for the given territory, according to the prior art.
Figure 3:
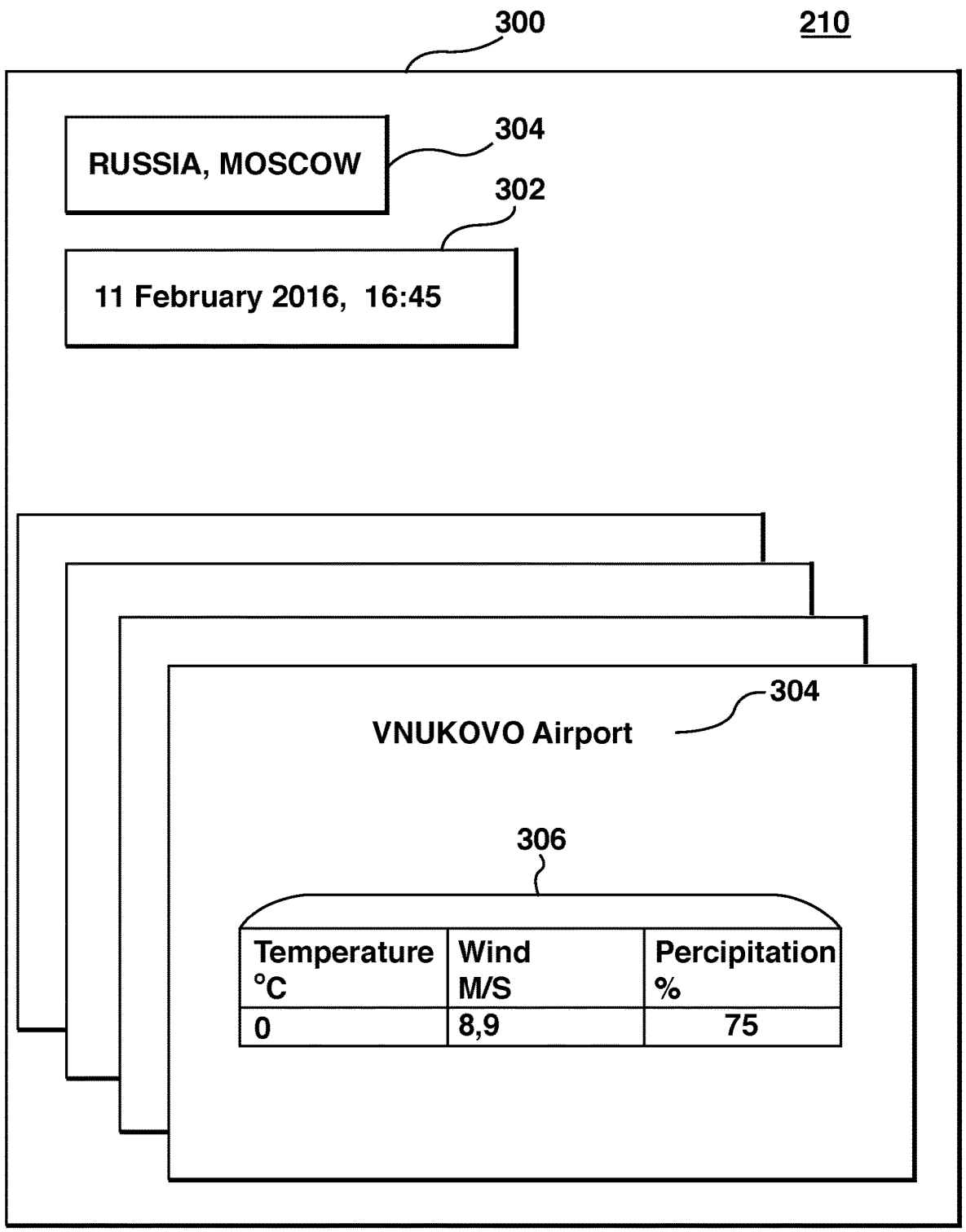
FIG. 3 is an illustrative example of a database of current weather parameters, the database implemented in accordance with non-limiting embodiments of the present technology.

With reference to FIG. 2 and FIG. 3, the main purpose of current weather parameters data storage 210 is to store a current weather parameters database 300. Populating the current weather parameters database 300 is done in real-time or near real-time by receiving measured or calculated weather parameters for the specific geographical area, namely, from weather stations, weather balloons and weather satellites (not depicted). The example in FIG. 1 shows data received on Feb. 11, 2016 at 4:45 p.m. in real-time from the weather station located near Vkukovo airport, Moscow. The example of the current weather parameters database 300 can be the database of Rosgidromet or, for example, the database of the United States National Oceanic and Atmospheric Administration (NOAA), or, for example, the data base of the WMO.

In another embodiment of the present technology, the server 202 configured to receive the data directly from at least one weather station and to form the current weather parameters database 300.

In FIG. 3 there is depicted an example of the current weather parameters database 300 located at the current weather parameters data storage 210. A specific example of FIG. 3 shows current time and date 302 (Feb. 11, 2016, 4:45 p.m.), a location 304 (Russia, Moscow, Vnukovo Airport) and current values 306 of the weather parameters received from the weather station in real-time or near real-time In should be noted, that the quantity and the quality of the current weather parameters database 300 populating is not limited. For example, the current weather parameters database 300 can contain at least one current weather parameter for at least one location. The current weather parameters database 300 can also contain significantly more current weather parameters, observed or calculated, for various locations. As the current weather parameters the following can be used: air temperature, water temperature, atmospheric pressure, wind velocity, wind direction, humidity, cloudiness, precipitation.

With reference to FIG. 2 and FIG. 4, the main purpose of the historical weather parameters data storage 212 is to store a historical weather parameters database 400. The historical weather parameters database 400 may store historical data about the observed weather parameters for certain locations for the certain time period along with their average values. The illustrative example in FIG. 4 shows the historical weather parameters database 400 containing data 402 about the measurement date (Feb. 11, 2001-2015), location data 404 (Russia, Moscow, Vnukovo Airport), historical weather parameters 406 (air temperature, wind velocity, humidity). The number and the quality of the elements populating the historical weather parameters database 400 are not limited, however, available retrospective of the historical changes for the various locations may differ.

Turning now to FIG. 2, there is depicted a third-party weather forecast service 222 presented as a server connected to the communication network 208. The third-party weather forecast service 222 includes a forecasting parameters database 224 for at least one locations for at least one moment in the future (after the current moment) and/or the time period and the future. The third-party weather forecast service 222 can receive the values of the weather forecasting parameters for the moment of forecasting using various methods and algorithms and store them in the a forecasting parameters database 224 of forecasting parameters. For the purposes of the present technology, it is not important how the third-party weather forecast service 222 receive the weather forecasting parameters for the specific location for the moment of forecasting.

In FIG. 5 there is depicted an illustrative example of the a forecasting parameters database 224 of weather forecasting parameters containing only two entries for only one location, in real life, however, the a forecasting parameters database 224 can contain a much larger number of entries. For example, monthly forecast (for each day of the next month) for 10,000 locations or, for example, weekly forecast for two locations, etc.

In FIG. 5 there is depicted the a forecasting parameters database 224 containing only one weather parameter—air temperature. The number of the forecasting parameters is also not limited. At least one of the following can be selected as a weather parameter: air temperature, water temperature, atmospheric pressure, wind velocity, wind direction, humidity, cloudiness, precipitation.

The third-party weather forecast service 222 can include a historical forecasts database 226 (FIG. 5). The historical forecasts database 226 stores the historical weather parameter forecasts made by the third-party weather forecast service 222. For example, for Feb. 11, 2016 for the location Russia, Moscow, Vnukovo Airport a month before the date (January 11), the third-party weather forecast service 222 was forecasting that the air temperature will be −5° C., two weeks before the date −3° C., and three days before the date +1° C. All this historical data can be stored in the historical forecasts database 226.

The server 202 is configured to receive from the third-party weather forecast service 222 via the communication network 208 the weather forecasting parameters from the forecasting parameters database 224. In another implementation of the present technology, the machine learning module 206 of the server 202 is configured to receive at least one value of the weather forecasting parameter for the moment of forecasting.

The server 202 is configured to receive from the third-party weather forecast service 222 via the communication network 208 the historical weather forecasting parameters from the historical forecasts database 226. The historical forecasts database 226 can be stored at the third-party weather forecast service 222 as shown in FIG. 2, however, in one implementation of the present technology, the historical forecasts database 226 can be hosted on the server 202, the historical forecasts database 226 having been populated by tracking the forecasting parameters database 224 of the third-party weather forecast service 222. The machine learning module 206 is configured to use received weather forecasting parameters and/or historical weather forecasting parameters from the third-party weather forecast service 222 as additional input parameters for the machine learning algorithm.

The computer system 200 can further comprise an electronic device 232. The electronic device 232 is typically associated with a user 230 and, as such, can sometimes be referred to as a "client device". It should be noted that the fact that the electronic device 232 is associated with the user does not mean to suggest or imply any mode of operation—such as a need to log in, a need to be registered or the like.

The implementation of the electronic device 232 is not particularly limited, but as an example, the electronic device 232 may be implemented as a personal computer (desktops, laptops, netbooks, etc.), a wireless communication device (such as a smartphone, a cell phone, a tablet and the like), as well as network equipment (such as routers, switches, and gateways).

Electronic device 232 includes hardware and/or software and/or firmware (or a combination thereof) which allows the access to information stored on the server 202 and to the third-party weather forecast service 222, and allows sending requests via the communication network 208. The electronic device 232 can send the request to create a weather forecast to the server 202 via the communication network 208, and the server 202 is configured to receive the request to create the weather forecast. The electronic device 232 can also send data about the location (for example, geolocation data) to the server 202. In one embodiment of the present technology, the server 202 is configured to receive data about the object location from the electronic device 232 via the communication network 208.

Accessing the information stored on the server 202 and the third-party weather forecast service 222 and sending the requests can be executed by the electronic device 232 using a browser application by the user 230 accessing a corresponding web-site. Alternatively or additionally, the electronic device 232 can have installed a proprietary software of the data provider, the software provides data exchange with the corresponding data provider, for example, with the server 202 and/or the third-party weather forecast service 222.

In one implementation of the present technology, the electronic device 232 is configured to send the request to provide a weather forecast with an indication to a specific moment of forecasting. For example, the user 230 wants to receive a weather forecast for a specific date (in the future), e.g. Feb. 12, 2016.

In one embodiment, the electronic device 232 is configured to send to the server 202 a request with an indication to the specific location of the user 230 associated with the electronic device 232.

Figure 6:
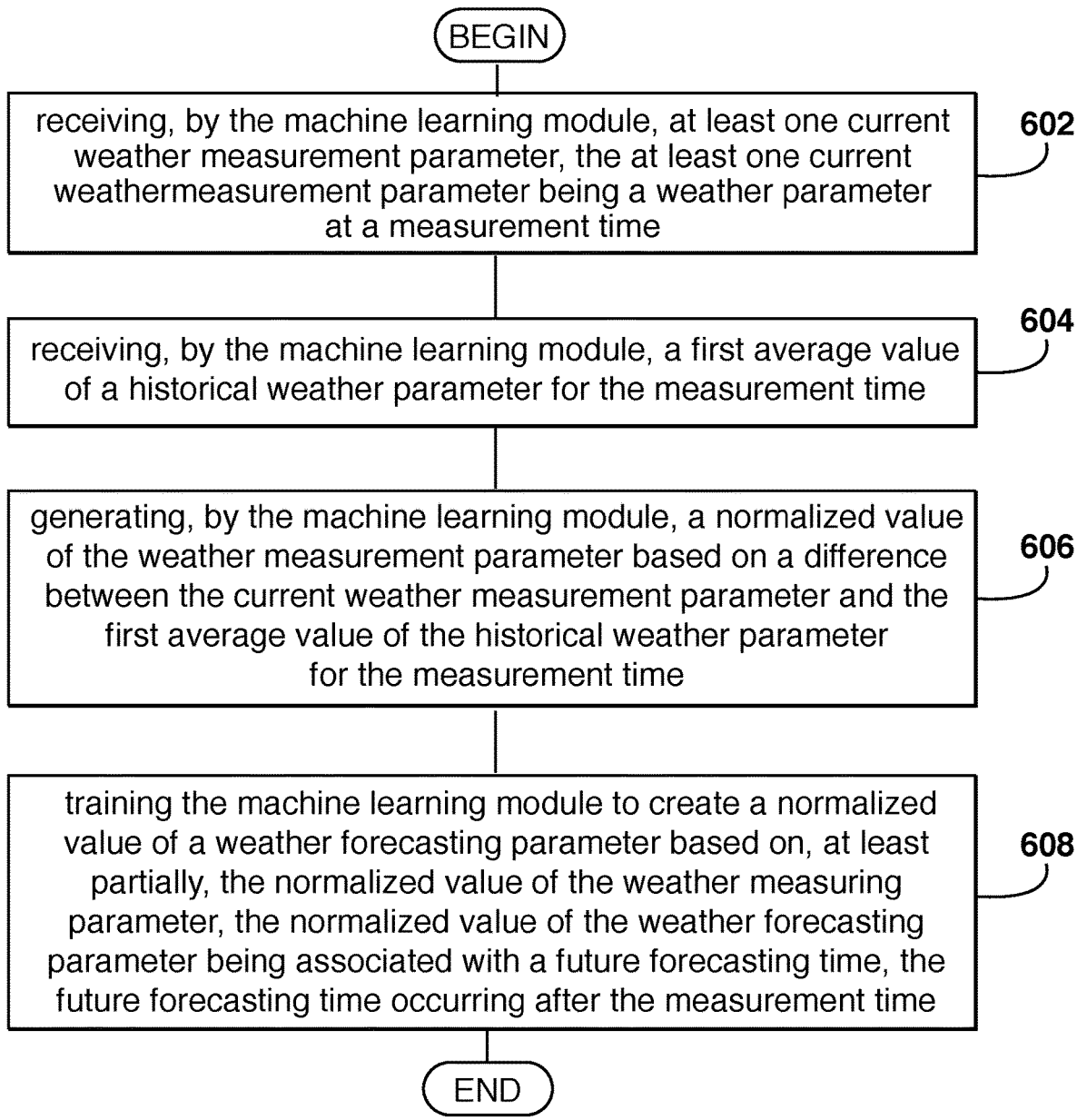
FIG. 6 is a flowchart of a method of creating a weather forecast implemented by a server in the system of FIG. 2, the method executed according to non-limiting embodiments of the present technology.

With reference to FIG. 6, there is depicted a block diagram showing steps of a method 600, the method 600 being executed according to non-limiting embodiments of the present technology.

Step 602—Receiving by a Machine Learning Module at Least One Current Weather Measurement Parameter Being a Weather Parameter at a Measurement Time.

The method 600 begins at step 602, where the machine learning module 206 of the server 202 receives from the current weather parameters database 300 of the current weather parameters data storage 210 at least one current weather measurement parameter connected to the corresponding location at the measurement time.

The weather measurement parameter can be at least one of the following: air temperature, water temperature, atmospheric pressure, wind velocity, wind direction, humidity, cloudiness, precipitation.

In one embodiment of the present technology, the machine learning module 206 of the server 202 receives the at least one current weather measurement parameter directly from at least one measuring device (not depicted). Construction and type of such a device is not limited and its selection should be based on the measured weather parameter and the accuracy of measurements. The measuring device can be, for example, thermometer, anemometer, hygrometer, barometer, etc.

Method 600 then proceeds to step 604.

Step 604—Receiving by the Machine Learning Module an Average Value of a Historical Weather Parameter for the Measurement Time.

At the 604, the machine learning module 206 of the server 202 receives from the historical weather parameters database 400 of the corresponding data storage at least one first average value of the historical weather parameter for the moment related to the corresponding location.

In some embodiments of the present technology, the server 202 further comprises an average value calculating module (not shown) containing machine-readable instructions, which when executed, are configured to cause the processor 204 to calculate average values of the historical weather parameter. The machine learning module 206 can also comprise the machine-readable instructions for calculating the average value of the historical weather parameter for the measurement time. Upon receiving the historical data from the historical weather parameters database 400, the processor 204 calculates the value for each of the historical weather parameters 406. It is noted that the the first average value of the historical weather parameter can be calculated based on some or all data available in the historical weather parameters database 400. For example, the first average value of the historical weather parameter can be the average air temperature value in Vnukovo Airport area on February 11 for last 5 years. Alternatively, the first average value of the historical weather parameter can be the average humidity value in Vnukovo Airport area on February 11 for last 14 years. Alternatively or additionally, the historical weather parameters database 400 can comprise calculated average values of historical weather parameters. The machine learning module 206 can receive the first average value of the historical weather parameter not only from the average value calculating module (not shown) but also directly from the the historical weather parameters database 400. The average value calculating module (not shown) can be a part of the machine learning module 206.

In one embodiment of the method, the machine learning module 206 is configured for receiving the second average value of the historical weather parameter for the moment of forecasting. For example, the first average value of the historical weather parameter for the measurement time can be an average value of the air temperature in Vnukovo Airport area on February 11 for the last 5 years, and the second average value of the historical weather parameter for the moment of forecasting can be an average value of the air temperature in Vnukovo Airport area on February 12 for the last 5 years. It is obvious that another retrospective of the historical weather parameters, date, location and so on, based on the available data in the historical weather parameters database 400 can also be selected.

In some implementations of the method, the first average value of the historical weather parameter is based on a historical weather parameter data received prior to the current weather measurement parameter prior to the measurement time.

In some implementations of the method, the first average value of the historical weather parameter is created based on a historical weather parameter data using a static model of weather forecasting.

In some implementations of the method, the first average value of the historical weather parameter is created based on a historical weather parameter data using a second machine learning algorithm. For example, if the historical data about the weather parameter in the historical weather parameters database 400 of the historical weather parameters data storage 212 is unavailable or insufficient, missing data can be generated using the second machine learning algorithm. If not all historical weather parameters 406 are available, as shown in FIG. 4 (blank fields in the table), the average value of the historical weather parameter for the measurement time can be generated after the training of the second machine learning algorithm based on the known (filled fields in the table) historical weather parameters in the historical weather parameters database 400. The server 202 can include at least one second machine learning module (not shown). Alternatively or additionally, the second machine learning algorithm can be implemented by the machine learning module 206.

In one embodiment, as an input data, the machine learning module 206 can receive from the third-party weather forecast service 222 at least one value of the weather forecasting parameter for the point of time of forecasting.

In one embodiment, as an input data, the machine learning module 206 can receive from the third-party weather forecast service 222 at least one value of the weather forecasting parameter for the point of time of forecasting and the historical weather forecasting data by the mentioned third-party weather forecast service before the measurement time.

In some implementations of the method, a third-party weather forecast service 222 is a plurality of third-party weather forecast services, and a value of the weather forecasting parameter for the moment of forecasting is an average value of the forecasting parameters received from the plurality of third-party weather forecast services for the moment of forecasting. The average value of the forecasting parameters received from the plurality of third-party weather forecast services for the moment of forecasting can be calculated by the machine learning module 206 of the server 202, or a separate average value calculating module (not shown). Examples of the third-party weather forecast service 222 can be: weather.com, gismeteo.ru, etc.

Further, method proceeds to step 606.

Step 606—Creating by the Machine Learning Module a Normalized Value of a Weather Measurement Parameter Based on a Difference Between a Current Weather Measurement Parameter and a First Average Value of the Historical Weather Parameter for the Measurement Time.

At the step 606, the server 202 creates by the machine learning module a normalized value of a weather measurement parameter based on a difference between a current weather measurement parameter and a first average value of the historical weather parameter for the measurement time.

With a reference to illustrative examples in FIG. 3 and FIG. 4, the processor is configured to determine a difference between a current weather measurement parameter for Vnukovo Airport on Feb. 11, 2016 and an average historical value of the same weather parameter for the same location and the same date.

The normalized value of the weather measurement parameter can be calculated according to formula $\Delta T=|T1-T2|$, where T1—a current weather measurement parameter, T2—an average value of the historical weather parameter, and $\Delta T$—a normalized value of the weather measurement parameter.

In one embodiment, the method further comprises: receiving by the machine learning module a second average value of a historical weather parameter for the measurement time; creating by the machine learning module a weather forecasting parameter based on the difference between the normalized value of the weather forecasting parameter and the second average value of the historical weather parameter for the moment of forecasting.

Further, method proceeds to step 608.

Step 608—Training of the Machine Learning Module to Create a Normalized Value of a Weather Forecasting Parameter Based on, at Least Partially, a Normalized Value of a Weather Measuring Parameter, and the Normalized Value of the Weather Forecasting Parameter is Connected to the Moment of Forecasting After the Measurement Time.

At the step 608, the server 202 is executing the training of the machine learning module 206 to create a normalized value of a weather forecasting parameter based on, at least partially, a normalized value of a weather measuring parameter, and the normalized value of the weather forecasting parameter is connected to the moment of forecasting after the measurement time.

In some implementations of the present technology, the method 600 further comprises receiving by the machine learning module from a third-party weather forecast service at least one value of a weather forecasting parameter for the moment of forecasting; wherein training of the machine learning module to create the normalized value of the weather forecasting parameter is implemented taking into account the value of the weather forecasting parameter received from the third-party weather forecast service for the moment of forecasting and the normalized value of the weather measurement parameter, wherein the normalized value of the weather forecasting parameter is associated with the moment of forecasting after the measurement time.

In some implementations of the present technology, the method 600 further comprises receiving is implemented from a third-party weather forecast service at least one value of a weather forecasting parameter for the moment of forecasting and historical data of weather forecasting by the mentioned third-party weather forecast service prior the measurement time; wherein training of the machine learning module to create the normalized value of the weather forecasting parameter is implemented taking into account the value of the weather forecasting parameter received from the third-party weather forecast service for the moment of forecasting and the historical data of weather forecasting by the mentioned third-party weather forecast service, wherein the normalized value of the weather forecasting parameter is associated with the moment of forecasting after the current time.

In some implementations of the method, a third-party weather forecast service is a plurality of third-party weather forecast services, and a value of the weather forecasting parameter for the moment of forecasting is an average value of the forecasting parameters received from the plurality of third-party weather forecast services for the moment of forecasting.

In some implementations of the method, there is a set maximum deviation in forecasting parameter value received from the third-party weather forecast service from the normalized value of the weather forecasting parameter; responsive to the forecasting parameter value received from the third-party weather forecast service exceeding the maximum deviation, disregarding the given forecasting parameter value while creating the second normalized value of the weather measurement parameter.

The training of the machine learning algorithm is executed as follows. As an input data, the machine learning algorithm may use: a normalized value of a weather measurement parameter received based on a difference between a current weather measurement parameter, being a weather parameter at the measurement time, and a first average value of a historical weather parameter for the measurement time. Additionally, the machine learning algorithm can be use, as input parameters, at least one of the following: weather forecasting parameter received based on the difference between a normalized value of a weather forecasting parameter and a second average value of a historical weather parameter at the moment of forecasting, the second average value of a historical weather parameter at the moment of forecasting, at least one value of the weather forecasting parameter at the moment forecasting received from the third-party weather forecast service 222, historical data of weather forecasting by the third-party weather forecast service 222 before the measurement time. As the input data the normalized value of the weather forecasting parameter is received.

After the step 608, the method terminates.

Figure 7:
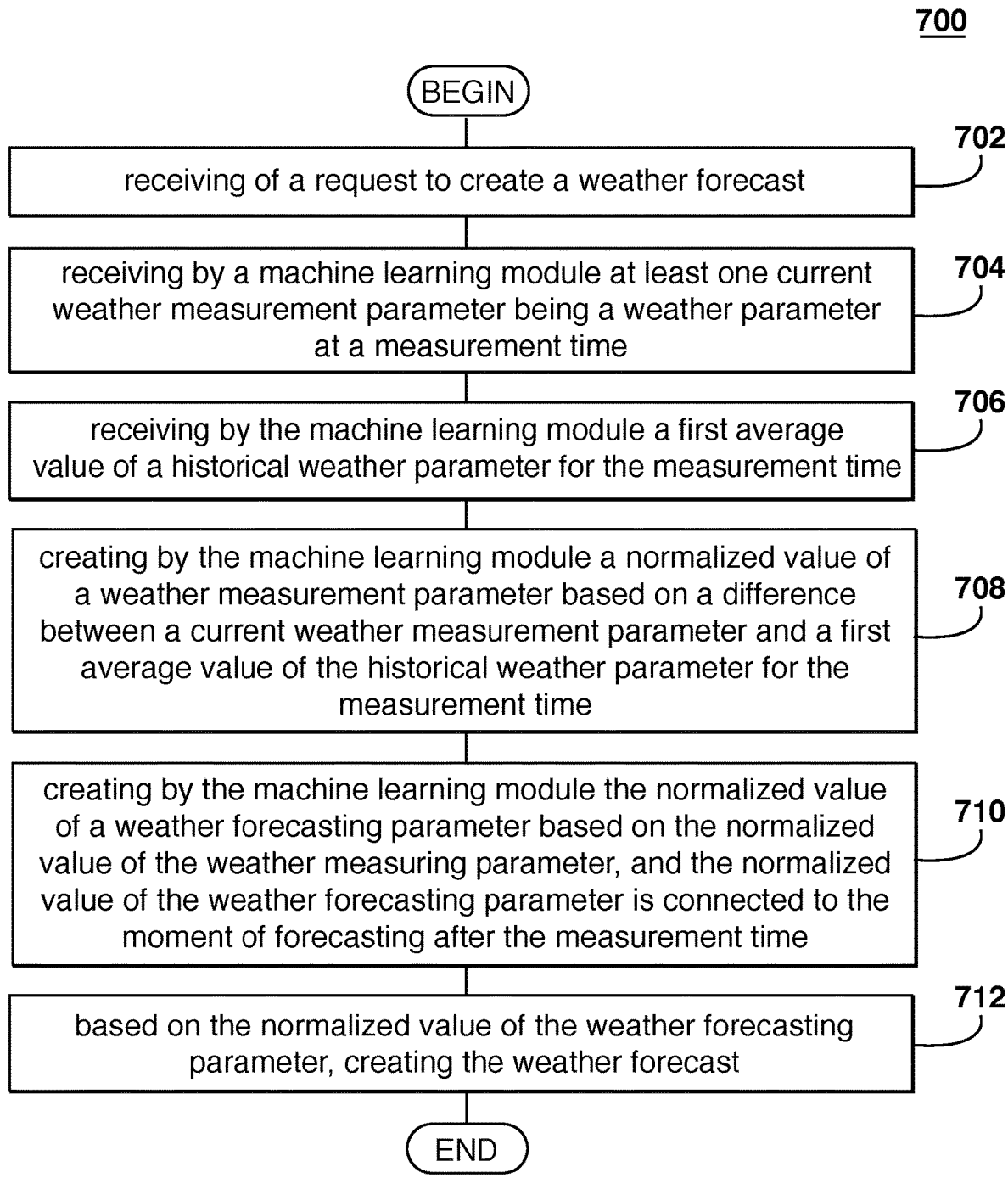
FIG. 7 is a flowchart of a method of creating a weather forecast implemented by a server in the system of FIG. 2, the method executed according to non-limiting embodiments of the present technology.

Turning now to FIG. 7, there is depicted a block diagram showing steps of a method 700, the method 700 being executed according to non-limiting embodiments of the present technology.

Step 702—Receiving a Request to Create a Weather Forecast.

The method 700 starts at the step 702, where the server 202 receives via communication network 208 a request to create a weather forecast. In one embodiment of the method, the request to create the weather forecast is received from the electronic device 232.

In another embodiment of the method, at the step of receiving the request, the method further comprises additionally receiving an indication to an object location. In yet another embodiment of the method, location data is received from the electronic device 232.

The location can be selected by a user 230 from the list of available locations with the electronic device 232, for example, Moscow, Vnukovo Airport. The list of available locations can be hosted on a web-resource available via communication network 208. Moreover, geolocation data indicating a specific location of the user 230, which was sent by the electronic device 232 via communication network 208 to the server 202, can be used as the location data.

Step 704—Receiving by a Machine Learning Module at Least One Current Weather Measurement Parameter Being a Weather Parameter at the Measurement Time.

The method 700 continues at the step 704, where the machine learning module 206 of the server 202 receives from the current weather parameters database 300 of the current weather parameters data storage 210 at least one current weather measurement parameter at the measurement time.

In some embodiments of the present technology, the weather measurement parameter is at least one of the following: air temperature, water temperature, atmospheric pressure, wind velocity, wind direction, humidity, cloudiness, precipitation.

In one embodiment of the method, the machine learning module 206 of the server 202 receives from the current weather parameters database 300 of the current weather parameters data storage 210 at least one current weather measurement parameter for the indicated object location at the measurement time.

In one embodiment of the present technology, the machine learning module 206 of the server 202 receives the at least one current weather measurement parameter directly from at least one measuring device. Construction and type of such a device is not limited and its selection should be based on the measured weather parameter and the accuracy of measurements. The measuring device can be, for example, thermometer, anemometer, hygrometer, barometer, etc.

Method 700 then proceeds to step 706.

Step 706—Receiving by the Machine Learning Module an Average Value of a Historical Weather Parameter for the Measurement Time.

At the 706, the machine learning module 206 of the server 202 receives from the historical weather parameters database 400 of the corresponding data storage at least one first average value of the historical weather parameter for the moment related to the indicated location.

In one embodiment of the method, the machine learning module 206 of the server 202 receives from the historical weather parameters database 400 of the corresponding data storage at least one first average value of the historical weather parameter for the moment related to the indicated location.

In one embodiment of the server 202, the server further comprises an average value calculating module (not shown) containing machine-readable instructions, which when executed, are configured to cause the processor 204 to calculate average values of the historical weather parameter. The machine learning module 206 can also comprise the mentioned machine-readable instructions for calculating the average value of the historical weather parameter for the measurement time. Upon receiving the historical data from the historical weather parameters database 400, the processor 204 calculates the value for each of the historical weather parameters 406. The first average value of the historical weather parameter can be received using some or all data available in the historical weather parameters database 400. For example, the first average value of the historical weather parameter can be the average air temperature value in Vnukovo Airport area on February 11 for last 5 years. Alternatively, the first average value of the historical weather parameter can be the average humidity value in Vnukovo Airport area on February 11 for last 14 years. Alternatively or additionally, the historical weather parameters database 400 can comprise calculated average values of historical weather parameters. The machine learning module 206 can receive the first average value of the historical weather parameter not only from the average value calculating module (not shown) but also directly from the historical weather parameters database 400. The average value calculating module (not shown) can be a part of the machine learning module 206.

In one embodiment of the method, the machine learning module 206 is further configured to receive the second average value of the historical weather parameter for the moment of forecasting. For example, the first average value of the historical weather parameter can be an average value of the air temperature in Vnukovo Airport area on February 11 for the last 5 years, and the second average value of the historical weather parameter for the moment of forecasting can be an average value of the air temperature in Vnukovo Airport area on February 15 for the last 5 years. Naturally, another retrospective of the historical weather parameters based on the available data in the historical weather parameters database 400 can also be selected.

In some implementations of the method, the first average value of the historical weather parameter is based on a historical weather parameter data received prior to the current weather measurement parameter prior to the measurement time.

In some implementations of the method, the first average value of the historical weather parameter is created based on a historical weather parameter data using a static model of weather forecasting.

In some implementations of the method, the first average value of the historical weather parameter is created based on a historical weather parameter data using a second machine learning algorithm. For example, if the historical weather parameter data in the historical weather parameters database 400 of the historical weather parameters data storage 212 is unavailable or insufficient, missing data can be received using the second machine learning algorithm. If not all historical weather parameters 406 are available, as shown in FIG. 4 (blank fields in the table), the average value of the historical weather parameter for the measurement time can be received after the training of the second machine learning algorithm based on the known (filled fields in the table) historical weather parameters in the historical weather parameters database 400. The server 202 can include at least one second machine learning module (not shown). Alternatively or additionally, the second machine learning algorithm can be implemented by the machine learning module 206.

In one embodiment, as input data, the machine learning module 206 can receive from the third-party weather forecast service 222 at least one value of the weather forecasting parameter for the point of time of forecasting.

In one embodiment, as input data, the machine learning module 206 can receive from the third-party weather forecast service 222 at least one value of the weather forecasting parameter for the point of time of forecasting and the historical weather forecasting data by the mentioned third-party weather forecast service before the measurement time.

In some implementations of the method, a third-party weather forecast service 222 is a plurality of third-party weather forecast services, and a value of the weather forecasting parameter for the moment of forecasting is an average value of the forecasting parameters received from the plurality of third-party weather forecast services for the moment of forecasting. The average value of the forecasting parameters received from the plurality of third-party weather forecast services for the moment of forecasting can be calculated by the machine learning module 206 of the server 202, or a separate average value calculating module (not shown).

In yet another implementation of the method, the current weather measurement parameter for the indicated object location is a weather parameter measured in the closest location related to the indicated object location; the first average value of the weather historical parameter for the measurement time for the indicated object location is the average value of the weather historical parameter for the closest location related to the indicated object location.

Further, method proceeds to step 708.

Step 708—Creating by the Machine Learning Module a Normalized Value of a Weather Measurement Parameter Based on a Difference Between a Current Weather Measurement Parameter and a First Average Value of the Historical Weather Parameter for the Measurement Time.

At the step 708, the server 202 creates by the machine learning module a normalized value of a weather measurement parameter based on a difference between a current weather measurement parameter and a first average value of the historical weather parameter for the measurement time.

In one embodiment of the method, at the step 708, the server 202 creates by the machine learning module a normalized value of a weather measurement parameter based on a difference between a current weather measurement parameter and a first average value of the historical weather parameter for the measurement time for the indicated object location.

With a reference to illustrative examples in FIG. 3 and FIG. 4, the processor is configured to determine a difference between a current weather measurement parameter for Vnukovo Airport on Feb. 11, 2016 and an average historical value of the same weather parameter for the same location and the same date.

The normalized value of the weather measurement parameter can be calculated according to formula $\Delta T = |T1 - T2|$, where $T1$—a current weather measurement parameter, $T2$—an average value of the historical weather parameter, and $\Delta T$—a normalized value of the weather measurement parameter.

In one embodiment, the method further comprises: receiving by the machine learning module a second average value of a historical weather parameter for the measurement time; creating by the machine learning module a weather forecasting parameter based on the difference between the normalized value of the weather forecasting parameter and the second average value of the historical weather parameter for the moment of forecasting.

Further, method proceeds to step 710.

Step 710—Creating by the Machine Learning Module the Normalized Value of the Weather Forecasting Parameter Based on, at Least Partially, the Normalized Value of the Weather Measuring Parameter, and the Normalized Value of the Weather Forecasting Parameter is Connected to the Moment of Forecasting After the Measurement Time.

At the step 710, the machine learning module 206 creates the normalized value of the weather forecasting parameter based on, at least partially, the normalized value of the weather measuring parameter, and the normalized value of the weather forecasting parameter is connected to the moment of forecasting after the measurement time. The machine learning module 206 is provisionally trained to create the normalized value of the weather forecasting parameter based on at least the normalized value of the weather measurement parameter.

The training of the machine learning algorithm can be executed as follows. The machine learning algorithm can use, as input data: a normalized value of a weather measurement parameter received based on a difference between a current weather measurement parameter, being a weather parameter at the measurement time, and a first average value of a historical weather parameter for the measurement time. Additionally, as an input parameters for the machine learning algorithm the following can be used: weather forecasting parameter received based on the difference between a normalized value of a weather forecasting parameter and a second average value of a historical weather parameter at the moment of forecasting, the second average value of a historical weather parameter at the moment of forecasting, at least one value of the weather forecasting parameter at the moment forecasting received from the third-party weather forecast service 222, historical data of weather forecasting by the third-party weather forecast service 222 before the measurement time. As the input data the normalized value of the weather forecasting parameter is received.

In one embodiment of the method, the machine learning module receives the second average value of the historical weather parameter at the moment of forecasting; the normalized value of the weather forecasting parameter for the moment of forecasting is compared to the second average value of the historical weather parameter at the moment of forecasting.

After the step 710, the method continues with step 712.

Step 712—Based on the Normalized Value of the Weather Forecasting Parameter, Creating a Weather Forecast.

At the step 712, taking into account the received normalized value of the weather forecast, the weather forecast is created.

The weather forecast includes at least one weather forecasting parameter for at least one moment of forecasting.

In one embodiment of the method, after the creating of the weather forecast, sending the weather forecast to the electronic device 232 is implemented.

In another embodiment of the method, at the step 712, taking into account the received normalized value of the weather forecast, the weather forecast for the indicated location is created.

In one implementation of the method, after the creating of the weather forecast for the indicated location, sending the weather forecast to the electronic device 232 is implemented.

After the step 712, the method terminates.

Modifications and improvements to the above-described implementations of the present technology may become apparent to those skilled in the art. The foregoing description is illustrative only and is not intended to be in any way limiting. The scope of the present technology is therefore intended to be limited solely by the scope of the appended clauses.

The invention claimed is:

1. A method of generating a weather forecast, the method executable on a server, the server including a processor and a machine learning module, the method comprising:
  receiving, by the machine learning module, at least one current weather measurement parameter, the at least one current weather measurement parameter being a weather parameter at a measurement time;
  receiving, by the machine learning module, a first average value of a historical weather parameter for the measurement time,
    the first average value of the historical weather parameter having been generated based on an indication of the measurement time;
  generating, by the machine learning module, a normalized value of the weather measurement parameter based on a difference between the current weather measurement parameter and the first average value of the historical weather parameter for the measurement time;
  training the machine learning module to predict a normalized value of a weather forecasting parameter based on the normalized value of the weather measurement parameter, the normalized value of the weather forecasting parameter being associated with a future forecasting time, the future forecasting time occurring after the measurement time,
    the normalized value of the weather forecasting parameter being indicative of a difference between a predicted value of the weather forecasting parameter and a second average value of the historical weather parameter associated with the future forecasting time;
  at a given point in the future forecasting time:
    receiving, by the machine learning module, a given average value of the historical weather parameter for the given point in the future forecasting time,
      the given average value of the historical weather parameter having been generated based on an indication of the given point in the future forecasting time;
    predicting, by the machine learning module, the normalized value of the weather forecasting parameter for the given point in the future forecasting time;
    generating, based on the normalized value of the weather forecasting parameter and the given average value of the historical parameter for the given point in the future forecasting time, the weather forecast.

2. The method of claim 1, wherein the first average value of the historical weather parameter is based on a historical weather parameter data received prior to the measurement time.

3. The method of claim 2, wherein the method further comprises generating the first average value of the historical weather parameter based on the historical weather parameter data using a static model of weather forecasting.

4. The method of claim 2, wherein the method further comprises generating the first average value of the historical weather parameter based on the historical weather parameter data, the generating executed using a second machine learning algorithm.

5. The method of claim 1, wherein the weather measurement parameter is at least one of: an air temperature, a water temperature, an atmospheric pressure, a wind velocity, a wind direction, humidity, cloudiness, and precipitation.

6. The method of claim 1, wherein the method further comprises receiving from a third-party weather forecast service: at least one value of the weather forecasting parameter at the moment for the future forecasting time and the historical weather forecasting data; and wherein
  the training of the machine learning module to create the normalized value of the weather forecasting parameter is executed taking into account the value of the weather forecasting parameter and the historical data of the weather forecasts.

7. The method of claim 6, wherein the third-party weather forecast service is a plurality of third-party weather forecast services, and a value of the weather forecasting parameter for the moment of forecasting is an average value of the forecasting parameters received from the plurality of third-party weather forecast services.

8. The method of claim 7, wherein the method further comprises setting a maximum deviation parameter for the forecasting parameter value received from the third-party weather forecast services relative to the normalized value of the weather forecasting parameter; and wherein the method further comprises:
  responsive to a given forecasting parameter value received from a given third-party weather forecast service exceeding the maximum deviation parameter, disregarding the given forecasting parameter value while creating the second normalized value of the weather measurement parameter.

9. The method of claim 1, wherein the method further comprises receiving an indication of the future forecasting time.

10. The method of claim 1, wherein the future forecasting time is a plurality of future forecasting times, and wherein the machine learning module generates a plurality of the normalized values of the weather forecasting parameters for each one of the future forecasting times.

11. The method of claim 10, wherein each of the plurality of future forecasting times is associated with one of a plurality of related geographic regions for a single moment of time.

12. The method of claim 1, wherein the method further comprises receiving a request with an indication to a specific object location, and wherein generating the normalized value of the forecast parameter for the indicated object location is executed.

13. The method of claim 1, wherein the method further comprises receiving, by the machine learning module, from a third-party weather forecast service at least one value of the weather forecasting parameter for the future forecasting time; and wherein
the training of the machine learning module to create the normalized value of the weather forecasting parameter is executed taking into account the value of the weather forecasting parameter and the normalized value of the weather measurement parameter.

14. A method of creating a weather forecast, the method being executed on a server including a processor and a machine learning module, the method comprises:
receiving of a request to create a weather forecast;
receiving by a machine learning module at least one current weather measurement parameter being a weather parameter at a measurement time;
receiving by the machine learning module a first average value of a historical weather parameter for the measurement time;
the first average value of the historical weather parameter having been generated based on an indication of the measurement time;
creating by the machine learning module a normalized value of a weather measurement parameter based on a difference between a current weather measurement parameter and the first average value of the historical weather parameter for the measurement time;
creating by the machine learning module a normalized value of a weather forecasting parameter based on the normalized value of the weather measurement parameter, the normalized value of the weather forecasting parameter is connected to a future forecasting time following after the measurement time,
the normalized value of the weather forecasting parameter being indicative of a difference between a predicted value of the weather forecasting parameter and a second average value of the historical weather parameter associated with the future forecasting time;
at a given point in the future forecasting time:
receiving a given average value of the historical weather parameter for the given point in the future forecasting time,
the given average value of the historical weather parameter having been generated based on an indication of the given point in the future forecasting time;
predicting, based on the normalized value of the weather measurement parameter, the normalized value of the weather forecasting parameter for the given point in the future forecasting time;
based on the normalized value of the weather forecasting parameter and the given average value of the historical parameter for the given point in the future forecasting time, creating the weather forecast.

15. A server for creating a weather forecast, the server comprising:
a machine learning module and a processor operationally connected to the machine learning module,
the processor is configured to execute:
receiving, by the machine learning module, at least one current weather measurement parameter, the at least one current weather measurement parameter being a weather parameter at a measurement time;
receiving, by the machine learning module, a first average value of a historical weather parameter for the measurement time,
the first average value of the historical weather parameter having been generated based on an indication of the measurement time;
generating, by the machine learning module, a normalized value of the weather measurement parameter based on a difference between the current weather measurement parameter and the first average value of the historical weather parameter for the measurement time;
training the machine learning module to create a normalized value of a weather forecasting parameter based on the normalized value of the weather measurement parameter, the normalized value of the weather forecasting parameter being associated with a future forecasting time, the future forecasting time occurring after the measurement time,
the normalized value of the weather forecasting parameter being indicative of a difference between a predicted value of the weather forecasting parameter and a second average value of the historical weather parameter associated with the future forecasting time;
at a given point in the future forecasting time:
receiving, by the machine learning module, a given average value of the historical weather parameter for the given point in the future forecasting time,
the given average value of the historical weather parameter having been generated based on an indication of the given point in the future forecasting time;
predicting, by the machine learning module, the normalized value of the weather forecasting parameter for the given point in the future forecasting time;
generating, based on the normalized value of the weather forecasting parameter and the given average value of the historical parameter for the given point in the future forecasting time, the weather forecast.

16. A method of generating a weather forecast, the method executable on a server, the server including a processor and a machine learning module, the method comprising:
receiving, by the machine learning module, at least one current weather measurement parameter, the at least one current weather measurement parameter being a weather parameter at a measurement time;
receiving, by the machine learning module, a first average value of a historical weather parameter for the measurement time,
the first average value of the historical weather parameter having been generated based on an indication of the measurement time;
generating, by the machine learning module, a normalized value of the weather measurement parameter based on a difference between the current weather measurement parameter and the first average value of the historical weather parameter for the measurement time, wherein the normalized value of the weather measurement parameter is calculated according to a formula:

$$\Delta T = |T1 - T2|,$$

where T1 is the current weather measurement parameter, T2 is the first average value of the historical weather parameter;

training the machine learning module to create a normalized value of a weather forecasting parameter based on, at least partially, the normalized value of the weather measuring parameter, the normalized value of the weather forecasting parameter being associated with a future forecasting time, the future forecasting time occurring after the measurement time;

the normalized value of the weather forecasting parameter being indicative of a difference between a predicted value of the weather forecasting parameter and a second average value of the historical weather parameter associated with the future forecasting time;

at a given point in the future forecasting time:
  receiving, by the machine learning module, a given average value of the historical weather parameter for the given point in the future forecasting time,
    the given average value of the historical weather parameter having been generated based on an indication of the given point in the future forecasting time;
  predicting, by the machine learning module, the normalized value of the weather forecasting parameter for the given point in the future forecasting time;

based on the normalized value of the weather forecasting parameter and the given average value of the historical weather parameter, creating the weather forecast.

* * * * *